(12) United States Patent
Cuch et al.

(10) Patent No.: US 6,660,348 B2
(45) Date of Patent: Dec. 9, 2003

(54) INK JET RECORDING MATERIAL DEMONSTRATING A BALANCE OF PROPERTIES INCLUDING IMPROVED IMAGING PERFORMANCE AND GOOD WATER RESISTANCE

(75) Inventors: Simon R. Cuch, Longmeadow, MA (US); George R. Stevens, Jr., Belchertown, MA (US); Brian R. Waite, Longmeadow, MA (US)

(73) Assignee: Kanzaki Specialty Papers, Inc., Ware, MA (US)

( * ) Notice: Subject to any disclaimer, the term of this patent is extended or adjusted under 35 U.S.C. 154(b) by 0 days.

(21) Appl. No.: 10/261,456

(22) Filed: Sep. 30, 2002

(65) Prior Publication Data

US 2003/0114573 A1 Jun. 19, 2003

Related U.S. Application Data

(62) Division of application No. 09/568,376, filed on May 10, 2000, now Pat. No. 6,482,883.

(51) Int. Cl.[7] .......................... B32B 27/18; B32B 27/30; C08K 3/36; C08L 29/04
(52) U.S. Cl. ............................. 428/32.34; 428/32.29; 428/32.37; 428/32.38; 524/492; 524/493; 524/503
(58) Field of Search ................................ 428/195, 206, 428/331, 32.34, 32.37, 32.38, 32.29; 524/492, 493, 557, 503

(56) References Cited

U.S. PATENT DOCUMENTS

| | | | | |
|---|---|---|---|---|
| 5,372,884 A | * | 12/1994 | Abe et al. | 428/331 |
| 5,616,409 A | * | 4/1997 | Matsuda et al. | 428/323 |
| 5,856,001 A | * | 1/1999 | Okumura et al. | 428/331 |
| 5,858,555 A | * | 1/1999 | Kuroyama et al. | 428/537.7 |
| 5,985,425 A | * | 11/1999 | Tomizawa et al. | 428/212 |
| 6,066,691 A | * | 5/2000 | Sobottka et al. | 524/450 |
| 6,068,733 A | * | 5/2000 | Storbeck et al. | 162/135 |
| 6,187,430 B1 | * | 2/2001 | Mukoyoshi et al. | 428/331 |
| 6,511,736 B1 | * | 1/2003 | Asano et al. | 428/195 |

* cited by examiner

*Primary Examiner*—Callie Shosho
(74) *Attorney, Agent, or Firm*—Holland & Bonzagni, P.C.; Mary R. Bonzagni, Esq.

(57) ABSTRACT

An ink jet coating composition comprising a blend of silicas, a blend of super and/or fully and partially hydrolyzed polyvinyl alcohols, and a cationic resin is provided, where ink jet recording materials prepared from such compositions demonstrate a balance of properties including improved imaging performance and good water resistance.

9 Claims, No Drawings

INK JET RECORDING MATERIAL DEMONSTRATING A BALANCE OF PROPERTIES INCLUDING IMPROVED IMAGING PERFORMANCE AND GOOD WATER RESISTANCE

This application is a division of U.S. patent application Ser. No. 09/568,376, filed May 10, 2000 U.S. Pat. No. 6,482,883.

TECHNICAL FIELD

The present invention relates to an aqueous ink jet coating composition that comprises a blend of silicas, a blend of super and/or fully and partially hydrolyzed polyvinyl alcohols and a cationic resin. The present invention further relates to an ink jet recording material prepared from such a composition that demonstrates a balance of properties including improved imaging performance and good water resistance.

BACKGROUND ART

Performance requirements for ink jet recording papers are quite stringent. Such papers, for example, are required to be fast drying while allowing for ink jet printing with good image density and good color fidelity. In addition, these papers must be capable of being economically produced.

Various attempts have been made in the prior art to achieve an ink jet recording paper which satisfies each of these performance requirements. For example, U.S. Pat. No. 4,780,356 discloses a recording sheet comprising a sheet of paper and porous particles provided on the paper surface. The porous particles have an average pore size of from 10 to 5000 Å, a pore volume of from 0.05 to 3.0 cc/g and an average particle size of from 0.1 to 50 µm. Such particles may be coated on a paper surface by means of a binder such as polyvinyl alcohol.

U.S. Pat. No. 4,830,911 discloses a recording sheet for ink jet printers capable of forming water-resistant images by the use of an aqueous ink containing a water-soluble dye. The recording sheet is coated with a coating material containing at least one water-soluble cationic polymer, synthesized silica and polyvinyl alcohol.

U.S. Pat. No. 4,944,988 discloses an ink jet recording sheet having a coating formed on a surface thereof that comprises a pigment such as silica and various water-soluble cationic polymeric substances mixed into a water-insoluble or water-soluble resinous binder.

U.S. Pat. No. 5,013,603 discloses an ink jet recording element which comprises a paper substrate and a layer of a filler coated on the surface of the substrate. The filler comprises amorphous silica having a pore volume of more than 1.30 cc/g, and water-soluble binders.

U.S. Pat. No. 5,165,973 discloses an ink jet recording sheet which comprises an ink receptive layer of a coating material comprising both an ultra-fine anhydrous silica and a cationic polymer.

U.S. Pat. No. 5,213,873 discloses an aqueous ink jet recording sheet comprising: a substrate sheet and an aqueous ink image-receiving layer comprising (a) fine silica particles, (b) a binder consisting of at least one member selected from the group consisting of polyvinyl alcohol resins and silanol-modified polyvinyl alcohol resins, and (c) a cationic polymeric material.

U.S. Pat. No. 5,320,897 discloses an ink jet recording paper comprising a paper substrate which has been calendered and an ink receptive image-receiving layer thereon. The image receiving layer is formed by coating or saturating the substrate with an aqueous composition comprising a porous pigment such as silica, water soluble binder and/or cationic resin.

U.S. Pat. No. 5,541,002 discloses a printing paper comprising a paper substrate and a coating layer formed on at least one side of the substrate. The coating layer is formed from a coating composition comprising a white pigment such as amorphous silica and a water-soluble resin such as fully saponified polyvinyl alcohol and partially saponified polyvinyl alcohol.

U.S. Pat. No. 5,660,622 discloses a coating composition for ink jet recording sheets which includes a combination of hydrated amorphous synthetic silica, a synthetic binder, a cationic agent, a leveling-flow modifier, a dispersing agent, an optical brightener, remainder water.

U.S. Pat. No. 5,747,146 discloses a printing medium comprising a base material and an ink-receiving layer which comprises inorganic fine particles such as silica and a resin such as polyvinyl alcohol or modified polyvinyl alcohol.

U.S. Pat. No. 5,753,082 discloses a coating composition for ink jet recording which comprises a pigment such a synthetic silica, a water-base binder and a water-soluble cationic polymer.

U.S. Pat. No. 5,804,293 discloses a coating composition for recording paper that comprises (a) composite particulate amorphous precipitated silica, (b) aqueous solvent, and (c) water-soluble organic polymeric binder dissolved in the aqueous solvent.

U.S. Pat. No. 5,856,001 discloses an ink jet recording medium comprising a substrate and an ink receiving layer formed on the substrate. The ink receiving layer comprises porous xerogel pigment particles such as amorphous silica, a binder such as polyvinyl alcohol and cationic polymer, and further contains lubricants.

In addition, ink jet recording papers prepared from coating compositions made up of a blend of silicas and a super hydrolyzed polyvinyl alcohol binder have been sold by Kanzaki Specialty Papers Inc. under the trade designation KS-JET PREMIUM® ink jet recording papers.

Although some of these ink jet recording papers perform satisfactorily in terms of functional performance requirements, improvement in the area of imaging performance (e.g., intercolor bleeding and optical density) is still needed.

A need therefore exists for an ink jet recording material that demonstrates a balance of properties including improved imaging performance.

It is therefore an object of the present invention to provide such an ink jet recording material.

It is a more specific object of the present invention to provide an ink jet coating composition that allows for improved imaging performance.

It is a further object to provide an ink jet recording material prepared from such a coating composition that demonstrates a balance of properties including improved imaging performance and good water resistance.

SUMMARY OF THE INVENTION

The present invention therefore provides an aqueous ink jet coating composition that demonstrates a balance of properties including improved imaging performance and good water resistance and that comprises a blend of silica particles, a blend of super and/or fully and partially hydrolyzed polyvinyl alcohols, and a cationic resin.

Preferably, the inventive coating composition comprises:

a. from about 40 to about 95 percent by weight (% by wt.) (dry basis) (based on the total weight (dry basis) of pigment composition and water-soluble binder) of a pigment composition comprising a blend of silica particles,
   wherein a first quantity of silica particles has a pore volume ranging from about 1.4 to about 3.0 cubic centimeters per gram (cc/g) and an average particle size ranging from about 1 to about 17 microns ($\mu$), and wherein a second quantity of silica particles has a pore volume ranging from about 0.6 to about 1.3 cc/g and an average particle size ranging from about 1 to about 17$\mu$;

b. from about 60 to about 5% by wt. (dry basis) (based on the total weight (dry basis) of pigment composition and water-soluble binder) of a water-soluble binder comprising a blend of super and/or fully and partially hydrolyzed polyvinyl alcohols; and c. from about 1 to about 30% by wt. (dry basis) (based on the total weight (dry basis) of the coating composition) of a cationic resin.

The present invention further provides an ink jet recording material having an ink receptive layer on a substrate, said ink receptive layer being the aqueous ink jet coating composition identified above.

The foregoing and other features and advantages of the present invention will become more apparent from the following description.

BEST MODE FOR CARRYING OUT THE INVENTION

An ink jet recording material according to the present invention is characterized by having an ink receptive layer on a substrate, said ink receptive layer being an aqueous composition containing a pigment composition, a water-soluble binder and a cationic resin as its main components.

As a result of various studies concerning the ink receptive layer (aqueous composition), the present inventors have found that recorded images that have or demonstrate high image densities, low intercolor bleeding and good water resistance are produced when a blend of silicas and a blend of super and/or fully and partially hydrolyzed polyvinyl alcohols are used in the ink receptive layer of the inventive recording material.

The pigment composition of the aqueous ink jet coating composition of the present invention comprises a blend of silica particles. The silica blend is made up of: a first quantity of silica particles having a pore volume ranging from about 1.4 to about 3.0 cc/g and an average particle size ranging from about 1 to about 17$\mu$; and a second quantity of silica particles having a pore volume ranging from about 0.6 to about 1.3 cc/g and an average particle size ranging from about 1 to about 17$\mu$.

Silicas useful in the subject pigment composition include amorphous precipitated silicas, reinforced amorphous precipitated silicas, colloidal silica dispersions, fumed silicas, wax-free silica gels, and wax surface-treated silica gels, with preferred silicas being wax-free silica gels and wax surface-treated silica gels.

Specific preferred examples of silica particles having pore volumes and average particle sizes falling within the ranges specified for the first quantity of silica particles include SYLOID 234 wax-free silica gels and SYLOID 7000 wax surface-treated silica gels marketed by Grace Davison, W. R. Grace & Co., 7500 Grace Drive, Columbia, Md. 21044 ("Grace Davison").

A specific preferred example of silica particles having a pore volume and average particle size falling within the ranges specified for the second quantity of silica particles is SYLOID 620 silica gel, also marketed by Grace Davison.

The subject pigment composition may also contain alumina trihydrate, clays, calcined alumina, calcined clays, calcium carbonate and the like provided that any such additional component(s) does not serve to adversely impact upon the imaging performance properties of the pigment composition.

In a preferred embodiment, the pigment composition comprises:

a. from about 10 to about 90% by wt. of silica particles having a pore volume ranging from about 1.5 to about 2.5 cc/g and an average particle size ranging from about 1 to about 14 A; and b. from about 90 to about 10% by wt. of silica particles having a pore volume ranging from about 0.6 to about 1.2 cc/g and an average particle size ranging from about 5 to about 17$\mu$.

In a more preferred embodiment, the first quantity of silica particles comprises a blend of a wax-free silica gel and a wax surface-treated silica gel.

The water-soluble binder of the aqueous ink jet coating composition of the present invention comprises super and/or fully and partially hydrolyzed polyvinyl alcohols. The subject binder serves to enhance the coatability of the coating composition and further serves to reduce or eliminate dusting in the resulting recording material, while improving printability.

The subject binder may contain additional components (e.g., gelatin, casein, alginate, water soluble gums, cellulose derivatives, CMC, hydroxymethyl cellulose, hydroxypropyl cellulose, modified starch, ethoxylated starch, cationic starch, oxidized starch, polyvinyl pyrrolidone, amphoteric latex, maleic anhydride resins, polyester resins, polyacrylamide resins, melamine resins, polyvinyl acetate, acrylic vinyl polymers, and blends thereof) provided any such additional components(s) does not adversely impact upon the desirable properties of the binder.

The term "super hydrolyzed," as used herein, is intended to refer to those polyvinyl alcohols having a% hydrolysis ranging from about 99.3 to about 100, while the term "fully hydrolyzed" refers to a% hydrolysis ranging from about 98 to about 98.8. The term "partially hydrolyzed," on the other hand, denotes a polyvinyl alcohol having a% hydrolysis of from about 70 to about 97.

In a preferred embodiment, the partially hydrolyzed polyvinyl alcohol of the binder of the aqueous ink jet coating composition of the present invention has a% hydrolysis of from about 84 to about 92.

The super, fully and partially hydrolyzed polyvinyl alcohols of the water-soluble binder have preferred molecular weight ranges of from about 5,000 to about 186,000 (preferably from about 13,000 to about 150,000) and may be modified by adding a cation thereto. More specifically, the polyvinyl alcohols may be modified by silanol, carboxy and/or quaternary amine groups.

The subject binder preferably has a medium-to-low viscosity. More specifically, the binder has a preferred viscosity ranging from about 3 to about 80 centipoise (cps), as measured by a Brookfield Viscosimeter, model number DV-II+, using a 4% polyvinyl alcohol aqueous solution at 20° C.

A specific preferred example of a super hydrolyzed, medium viscosity polyvinyl alcohol is available from Air Products and Chemicals, Inc., 7201 Hamilton Blvd., Allentown, Pa. 18196-1501 ("Air Products") and is sold under the trade designation AIRVOL 125. Preferred medium and low viscosity partially hydrolyzed polyvinyl alcohols are also available from Air Products and are sold under the trade designations AIRVOL 523 and AIRVOL 205, respectively.

In a preferred embodiment, the water-soluble binder of the aqueous ink jet coating composition is a blend that comprises:

a. from about 10 to about 90% by wt. (more preferably from about 20 to about 80% by wt.) of a super hydrolyzed, medium viscosity polyvinyl alcohol;

b. from about 10 to about 70% by wt. (more preferably from about 15 to about 65% by wt.) of a partially hydrolyzed, medium viscosity polyvinyl alcohol; and c. from about 0 to about 20% by wt. (more preferably from about 5 to about 15% by wt.) of a partially hydrolyzed, low viscosity polyvinyl alcohol.

In a more preferred embodiment, the binder further comprises from about 1 to about 50% by wt., based on the total weight of the binder, of a cationic starch. The cationic starch serves to improve surface strength, coatability and printability. Suitable examples of such a cationic starch include corn, potato, rice, tapioca, waxy maize and wheat. In a preferred embodiment, the cationic starch is waxy maize or amylopectin polymer.

The cationic resin of the aqueous ink jet coating composition of the present invention serves as a fixing agent of ink and improves the fixing of recorded images and water resistance.

Preferred cationic resins include polyvinyl benzyl trimethyl ammonium chloride, polydiallyl dimethyl ammonium chloride, polymethacryloxyethyl hydroxy ethyldiammonium chloride, quaternary acrylic copolymer latex, amidoepichlohydrin copolymer, dimethylaminoethylmethacrylate copolymer, vinyl pyrrolidone dimethylaminoethylmethacrylate copolymer, polyallylamine, polyvinylamine, vinyl amine acrylonitrile copolymers, polyalkylene imine polymers, polyalkylene polyamine polymers, polyalkylene polyamide dicyandiamide copolymers, polyamide dicyandiamide copolymers, quaternary ammonium polymers and blends thereof. In a preferred embodiment, the cationic resin is a quaternary ammonium polymer and, more preferably, is polydiallyl dimethyl ammonium chloride marketed by Calgon Corporation, 2015 Christine Drive, Harleysville, Pa. 19438 under the trade designation CP-1030.

The cationic resin is present in the inventive aqueous ink jet coating composition in an amount ranging from about 1 to about 30% by wt., preferably from about 3 to about 15% by wt., based on the total weight of the dry coating composition. The present inventors have found that if the cationic resin is present in an amount below 1% by wt., the water resistance of the composition is very poor, and if the cationic resin is present in an amount above 30% by wt., printed image quality is adversely affected.

In addition to the above components, the aqueous ink jet coating composition of the present invention can advantageously contain other additives such as antioxidants, crosslinking agents, defoaming agents, dispersing agents, mold inhibitors, slip agents, UV absorbers, wetting agents and whitening agents. However, some such additives may adversely impact upon the desirable properties of the resulting ink jet recording material.

Preliminary studies have indicated that wax emulsion slip agents and, more specifically, polyethylene wax dispersions, may advantageously affect not only the frictional properties of the resulting recording material but also the wicking, bleeding and photoimaging properties of the material. A preferred polyethylene wax dispersion slip agent is manufactured by Michelman Inc., 9080 Shell Road, Cincinnati, Ohio 45236 ("Michelman") under the trade designation MICHEM 61335 high density polyethylene wax dispersion.

In a preferred embodiment, the aqueous ink jet coating composition of the present invention comprises:

a. from about 50 to about 90% by wt. (dry basis) (based on the total weight (dry basis) of pigment composition and water-soluble binder) of a pigment composition comprising a blend of silica particles, wherein a first quantity of silica particles has a pore volume ranging from about 1.5 to about 2.5 cc/g and an average particle size ranging from about 1 to about $14\mu$, and wherein a second quantity of silica particles has a pore volume ranging from about 0.6 to about 1.2 cc/g and an average particle size ranging from about 5 to about $17\mu$;

b. from about 10 to about 50% by wt. (dry basis) (based on the total weight (dry basis) of pigment composition and water-soluble binder) of a water-soluble binder comprising a blend of super and/or fully and partially hydrolyzed polyvinyl alcohols; and c. from about 3 to about 15% by wt. (dry basis) (based on the total weight (dry basis) of the coating composition) of a cationic resin.

In a more preferred embodiment, the inventive coating composition further comprises from about 1 to about 30% by wt. (dry basis) (based on the total weight (dry basis) of the coating composition) of a high density polyethylene wax emulsion slip agent.

It is noted that preliminary studies have indicated that the pigment composition and water-soluble binder of the present invention advantageously affect the L, a, b output and perceived hue and intensity of color images printed on the resulting ink jet recording material.

The inventive coating composition is prepared by mixing the components with water so as to obtain an aqueous composition having a solids content ranging from about 16 to about 19%, based on the total weight (dry basis) of the coating composition.

The substrate of the ink jet recording material of the present invention may be prepared from any suitable natural and/or synthetic fiber. For example, the substrate may be prepared from chemical, mechanical and/or recycled papermaking fibers. Polyester, vinyl acetate and/or polypropylene synthetic types of fibers may also be used.

The substrate preferably has a thickness ranging from about 100 to about $280\mu$, a basis weight ranging from about 70 to about 200 grams per square meter (g/m$^2$), and a surface smoothness of from about 10 to about 50 Bekk seconds.

The ink jet recording material of the present invention is obtained by coating at least one surface of the substrate with the aqueous coating composition and then drying the resulting layer to form an ink receptive layer on the substrate surface.

The aqueous coating composition of the present invention may be applied to the substrate surface using e.g., air knife coaters, rod coaters or gravure coaters. As will be readily appreciated by those skilled in the art, silica-based coating compositions are highly viscous even at low solids loadings. As a result, such compositions are not amenable to high shear coating applications such as those that involve the use of e.g., blade coaters.

In order to avoid degradation in ink absorptivity caused by the use of excessive amounts of coating, it is preferred that the coating composition of the present invention be applied so as to achieve an average coat weight that ranges from about 2 to about 16 g/m², based on the total weight (dry basis) of the coating composition.

Drying can be accomplished by any known method or technique including room temperature air drying, hot air drying, heating surface-contact drying or heat radiation drying.

The ink jet recording material of the present invention demonstrates a balance of properties including improved imaging performance and good water resistance. In addition, the inventive material preferably has a coefficient of friction (COF) below about 0.55 and, more preferably, from about 0.2 to about 0.4. Multifeeding during desktop printing operations is therefore reduced or eliminated.

The subject invention will now be described by reference to the following illustrative examples. The examples are not, however, intended to limit the generally broad scope of the present invention.

SPECIFIC EMBODIMENT

In the working examples set forth below, the following components were used:

| | |
|---|---|
| SILICA I | a silica gel having a pore volume of 1.7 cc/g and an average particle size of 5.2 m marketed by Grace Davison under the trade designation SYLOID 234 |
| SILICA II | a wax surface-treated silica gel having a pore volume of 1.8 cc/g and an average particle size of 4.5 m marketed by Grace Davison under the trade designation SYLOID 7000 |
| SILICA III | a silica gel having a pore volume of 1.2 cc/g and an average particle size of 12.5 m marketed by Grace Davison under the trade designation SYLOID 620 |
| SILICA IV | a silica gel having a pore volume of 0.8 cc/g and an average particle size of 0.3 m marketed by Grace Davison under the trade designation SYLOID 703A |
| BINDER I | a blend of the following components: |
| 1. | 40.0% by wt. (dry) of a super hydrolyzed, medium viscosity polyvinyl alcohol marketed by Air Products under the trade designation AIRVOL 125; |
| 2. | 35.0% by wt. (dry) of a partially hydrolyzed, medium viscosity polyvinyl alcohol marketed by Air Products under the trade designation AIRVOL 523; |
| 3. | 7.5% by wt. (dry) of a partially hydrolyzed, low viscosity polyvinyl alcohol marketed by Air Products under the trade designation AIRVOL 205; and |
| 4. | 17.5% by wt. (dry) of a cationic starch marketed by National Starch and Chemical Co., 10 Finderne Ave., P.O. Box 6500, Bridgewater, N.J. 08807 under the trade designation CATO SIZE 240A. |
| BINDER II | a super hydrolyzed, medium viscosity polyvinyl alcohol marketed by Air Products under the trade designation AIRVOL 125. |
| BINDER III | a partially hydrolyzed, medium viscosity polyvinyl alcohol marketed by Air Products under the trade designation AIRVOL 523. |
| DEFOAMING AGENT | a defoaming agent marketed by San Nopco Limited, 1–59, Nihonbashi Hon-Cho, Chuo-Ku, Tokyo 103 Japan, under the trade designation Nopco 1407-K. |
| FWA | a stilbene fluorescent whitening agent marketed by Ciba Specialty Chemicals Corporation, North America, 4090 Premier Drive, High Point, NC 27261, under the trade designation TINOPAL 150 PT. |
| CATIONIC RESIN | a quaternary ammonium polymer ((poly(dimethyldiallylammonium chloride) marketed by Calgon Corporation under the trade designation CP-1030. |
| SLIP AGENT | a high density polyethylene wax dispersion marketed by Michelman under the trade designation ME 61335 |
| WETTING AGENT | an ethoxylated acetylenic diol surfactant marketed by Air Products under the trade designation SURFYNOL 465. |

SAMPLE PREPARATION

1. Preparation of Aqueous Coating Composition.

The following pigment/binder compositions were used to prepare the aqueous coating compositions of the present examples:

| | Pigment/Binder Composition (% by wt.) | | | | | | |
|---|---|---|---|---|---|---|---|
| | Silica I | Silica II | Silica III | Silica IV | Binder I | Binder II | Binder III |
| A | 75 | | | | 25 | | |
| B | 75 | | | | | 25 | |
| C | 75 | | | | | | 25 |
| D | | 75 | | | 25 | | |
| E | | 75 | | | | 25 | |
| F | | 75 | | | | | 25 |
| G | | | 75 | 25 | | | |
| H | | | 75 | | 25 | | |
| I | | | 75 | | | 25 | |
| J | 22 | 9 | 44 | | 25 | | |
| K | 22 | 9 | 44 | | | 25 | |
| L | 22 | 9 | 44 | | | | 25 |
| M | 22 | 9 | | 44 | 25 | | |
| N | 22 | 9 | | 44 | | 25 | |
| O | 22 | 9 | | 44 | | | 25 |

The aqueous coating composition was prepared by mixing the following components with water so as to obtain an aqueous composition having a solids content of 16 to 19%.

75.7% by wt. (dry) Pigment/Binder Composition;

0.1% by wt. (dry) DEFOAMING AGENT;

3.3% by wt. (wet) FWA;

10.8% by wt. (dry) CATIONIC RESIN;

10.0% by wt. (dry) SLIP AGENT; and 0.1% by wt. (dry) WETTING AGENT.

2. Formation of Ink Receptive Layer.

An ink jet recording material was obtained by applying the aqueous coating composition to a base paper having a basis weight of 116 g/m² and a Cobb sizing of less than 100 g/m². The coating composition was applied by means of a wire rod so as to ensure a coat weight of 8 g/m². The coated paper was dried and then calendered at 35 newtons per millimeter (N/mm).

TEST METHODS

The coated ink jet papers were then subjected to several evaluation tests. Desktop printers manufactured by Epson America, Inc., P.O. Box 2842, Torrance, Calif. 90509, and Hewlett Packard Co., 8000 Foothills Boulevard, Roseville, Calif. 95747, and sold under the trade designations Epson Stylus Color 850 ("Epson 850") and HP DeskJet 722c ("HP 722c"), respectively, were used in conjunction with these tests. The printers were used to print images on the coated ink jet papers using four colors, namely—black, yellow, cyan and magenta. The Epson 850 printer was set at "Photo Quality Ink Jet Paper" (720 dpi), while the HP 722c printer was set at "Premium Ink Jet Paper" (720 dpi), prior to printing images on the coated ink jet papers.

For every test, commercial ink jet recording materials and OEM Papers, as identified below, were also tested for comparison purposes.

COMMERCIAL PAPERS

CP 2—an OEM ink jet recording material sold by Hewlett Packard Co. under the product designation "Hewlett Packard Premium Ink Jet Paper" Lot #CA 3421-02B. CP 2 is recommended for use with HP 722c desktop printers;

CP 1—an OEM ink jet recording material sold by Seiko Epson Corp. under the product designation "Epson Photo Quality Ink Jet Paper Lot #9EF29. CP 1 is recommended for use with Epson 850 desktop printers;

CP 3—a commercial ink jet recording material sold by Great White Consumer Products under the product designation "Great White Imaging and Photo Paper" Lot # WM10129919;

CP 4—a commercial ink jet recording material sold by IBM Corp. under the product designation "Matte Coated Ink Jet Paper"; and CP 5—a commercial ink jet recording material sold by Southworth Co. under the product designation "Coated Heavyweight Ink Jet Paper 36 lbs C2S."

The tests and standards used to evaluate the coated ink jet papers and Commercial Papers are described below.

Image Density

Image density is basically a measurement of the amount of light reflected by a sample. Image density is referred to as either optical density, color density or image density.

Black, cyan, magenta, yellow, red and green color densities were measured with an X-Rite 418 color densitometer. Generally, in this test, a higher image density value denotes a higher strength of the measured color. A low image density may indicate either excessive dot gain control or penetration of the inks into the substrate.

Black Wicking Rating

Black Wicking Rating or BWR relates to the black text printing performance of the ink jet recording material using a white background (or unprinted background area). The BWR of each sample was determined by: printing a series of identical black lines spaced 0.2mm apart on the sample using either an Epson 850 or HP 722c desktop printer; magnifying the image between adjacent black printed lines on the sample 68×; photographing the magnified image; cutting the area or portion between the adjacent lines in the photograph and weighing the cut portion; determining the basis weight of the photographic paper (BWT-PP); and determining the BWR of each sample using the formulas detailed below:

$$\text{Average Distance Between Lines (mm)} = \frac{\text{weight between lines on photograph (g)}}{BWT\text{-}PP \text{ (g/mm}^2\text{)}(68)}$$
$$(ADBL$$

$$BWR = \left(1 - \frac{|0.2 - ADBL|}{0.2}\right) \times 100$$

For this test, a "0" value denotes a high wicking rate (i.e., poor black text printing performance), while a "100" value denotes a low wicking rate (i.e., good black text printing performance).

Intercolor Bleeding Rating

Intercolor Bleeding Rating or ICBR relates to the black text printing performance of the ink jet recording material using a yellow background. Other combinations were possible (i.e., cyan over yellow, yellow over magenta, etc.), but black over yellow was deemed a good indication of intercolor bleeding. The ICBR test was similar to that noted above for BWR, except that black lines were printed over a yellow background area.

For this test, a "0" value denotes high black/yellow intercolor bleeding (i.e., poor intercolor bleeding performance), while a "100" value denotes an absence of black/yellow intercolor bleeding (i.e., good intercolor bleeding performance).

Visual PhotoImaging Rating

Visual PhotoImaging Rating or VPIR constitutes an evaluation of a printed photo image and basically involves a visual comparison of printed images. More specifically, a CD-Corel photo (size: 8.9 cm×11.4 cm; bitmap: 768×512 pixels; resolution: 169×169 dpi; 24 bit color RGB) was printed by either an Epson 850 or HP 722c desktop printer on each sample. The printed image on each sample coated with the inventive aqueous coating composition was then visually compared to the printed image on the relevant OEM Paper (i.e., CP 1 or CP 2). The following ratings were used to evaluate the degree of comparison:

| Rating | Degree of Comparison |
|---|---|
| 0 | Poor |
| 25 | Poor–Fair |
| 50 | Fair |
| 75 | Fair–Good |
| 100 | Good |

PhotoImaging Rating

PhotoImaging Rating or PIR constitutes a weighted average of the BWR, ICBR and VPIR values obtained for each sample. PIR was calculated in accordance with the following formula:

$$PIR = (BWR \times 0.25) + (ICBR \times 0.15) + (VPIR \times 0.60)$$

For this evaluation, a "0" value denotes a poor photoimaging rating, while a "100" value denotes a good photoimaging rating.

Density Rating

Density Rating or DR constitutes a relative measurement of weighted optical densities of a given sample against optical densities of the relevant OEM Paper (i.e., CP 1 or CP 2). More specifically, 100% tint black, magenta, red, yellow, green and cyan color areas were printed by either an Epson 850 or HP 722c desktop printer on each sample and OEM Paper. Black (BK), cyan (C), magenta (M), yellow (Y), red (R) and green (G) color densities (C.D.) were then measured and recorded for each sample and OEM Paper using an X-Rite 418 color densitometer. The density rating or DR for each sample was then determined using the follow formula:

$$DR = 100 + \left[\left(\frac{BK\ C.D.\ \text{Sample} - BK\ C.D.\ \text{OEM Paper}}{BK\ C.D.\ \text{OEM Paper}}\right) + \left(\frac{C\ C.D.\ \text{Sample} - C\ C.D.\ \text{OEM Paper}}{C\ C.D.\ \text{OEM Paper}}\right) + \left(\frac{M\ C.D.\ \text{Sample} - M\ C.D.\ \text{OEM Paper}}{M\ C.D.\ \text{OEM Paper}}\right) + \left(\frac{Y\ C.D.\ \text{Sample} - Y\ C.D.\ \text{OEM Paper}}{Y\ C.D.\ \text{OEM Paper}}\right) + \left(\frac{R\ C.D.\ \text{Sample} - R\ C.D.\ \text{OEM Paper}}{R\ C.D.\ \text{OEM Paper}}\right) + \left(\frac{G\ C.D.\ \text{Sample} - G\ C.D.\ \text{OEM Paper}}{G\ C.D.\ \text{OEM Paper}}\right)\right] \times 100$$

For this test, a "0" value denotes a poor density rating while values greater than or equal to "100" denote good density ratings.

Water Resistance

Water resistance relates to the degree of ink diffusion resulting from water immersion. More specifically, for this test, each sample was printed using either an Epson 850 or HP722c desktop printer. Each printed image was allowed to dry overnight and the relevant sample immersed in tap water for five minutes. The sample was then removed from the water, excess water removed by a paper towel, and the sample placed in a convection oven and dried for three minutes at 104° C. The degree of ink diffusion was then visually evaluated by the following relative evaluations:

Good: Minimal to no ink diffusion; low visual change in image densities; coating structure unaffected.

Fair: Low level of ink diffusion; low visual change in image densities; pinholes observed on printed areas.

Poor: High level of ink diffusion or a clear reduction in image densities or coating structure significantly affected.

EXAMPLES 1 TO 15 AND COMPARATIVE EXAMPLES CP 1 TO CP 5

In these examples, paper samples coated with aqueous coating compositions employing the referenced pigmentibinder compositions in addition to the Commercial Papers, identified above, were evaluated for Image Density, Black Wicking Rating (BWR), Intercolor Bleeding Rating (ICBR), Visual PhotoImaging Rating (VPIR), PhotoImaging Rating (PIR), Density Rating (DR) and Water Resistance. The results are set forth in Table 1 hereinbelow.

TABLE I

Summary of Examples 1 to 15 and Comparative Examples CP 1 to CP 5

| Example | % Solids | Pigment/ Binder Comp | EPSON 850 | | | | | | | | | | | |
|---|---|---|---|---|---|---|---|---|---|---|---|---|---|---|
| | | | Image Densities | | | | | | | | | | | Water |
| | | | blk | mag | red | yel | grn | cyan | BWR | ICBR | VPIR | PIR | DR | Resistance |
| 1 | 18.0 | A-Silica I & Binder I | 1.74 | 1.34 | 1.32 | 0.97 | 1.46 | 1.59 | 70 | 68 | 75 | 73 | 87 | Good |
| 2 | 18.1 | B-Silica I & Binder II | 1.7 | 1.3 | 1.3 | 0.97 | 1.42 | 1.59 | 90 | 66 | 75 | 77 | 79 | Good |
| 3 | 18.1 | C-Silica I & Binder III | 1.78 | 1.4 | 1.36 | 1.01 | 1.5 | 1.66 | 90.5 | 76.5 | 75 | 79 | 104 | Good |
| 4 | 17.7 | D-Silica II & Binder I | 1.74 | 1.38 | 1.37 | 1.01 | 1.36 | 1.58 | 89 | 68 | 75 | 77 | 84 | Good |
| 5 | 17.2 | E-Silica II & Binder II | 1.67 | 1.33 | 1.3 | 0.98 | 1.33 | 1.52 | 74 | 65.5 | 50 | 58 | 63 | Good |
| 6 | 16.9 | F-Silica II & Binder III | 1.78 | 1.4 | 1.41 | 1.03 | 1.43 | 1.62 | 91 | 72 | 75 | 79 | 100 | Fair |
| 7 | 19.3 | G-Silica III & Binder I | 1.85 | 1.59 | 1.56 | 1.16 | 1.51 | 1.59 | 82 | 53 | 0 | 28 | 144 | Good |
| 8 | 17.8 | H-Silica III & Binder II | 1.84 | 1.58 | 1.56 | 1.17 | 1.54 | 1.6 | 60.5 | 45.5 | 0 | 22 | 146 | Good |
| 9 | 18.4 | I-Silica III & Binder III | 1.86 | 1.61 | 1.6 | 1.15 | 1.58 | 1.63 | 83.5 | 69.5 | 25 | 46 | 155 | Poor |
| 10 | 18.8 | J-Silica I/ Silica II/ Silica III & Binder I | 1.8 | 1.47 | 1.44 | 1.06 | 1.51 | 1.66 | 84 | 65 | 100 | 91 | 119 | Good |
| 11 | 18.3 | K-Silica I/ Silica II/ Silica III & Binder II | 1.76 | 1.4 | 1.38 | 1.05 | 1.47 | 1.63 | 78.5 | 55.5 | 100 | 88 | 102 | Good |
| 12 | 18.4 | L-Silica I/ Silica II/ Silica III & Binder III | 1.82 | 1.5 | 1.47 | 1.09 | 1.54 | 1.7 | 84 5 | 68 5 | 100 | 91 | 131 | Poor |
| 13 | 17.2 | M-Silica I/Silica II/Silica IV & Binder I | 1.78 | 1.48 | 1.44 | 1.08 | 1.35 | 1.5 | 56 | 36 | 0 | 19 | 99 | Good |
| 14 | 17 4 | K-SilicaI/ Silica II/ Silica IV & Binder II | 1.78 | 1.48 | 1.44 | 1.11 | 1.34 | 1.5 | 56.5 | 31.5 | 0 | 19 | 102 | Good |
| 15 | 17 2 | SilicaI/ Silica II/ Silica IV & Binder III | 1.75 | 1.49 | 1.46 | 1.07 | 1.39 | 1.5 | 73.5 | 41.5 | 0 | 25 | 101 | Good |
| CP1 | | | 1.74 | 1.45 | 1.4 | 1.01 | 1.45 | 1.63 | 94 | 70 | 100 | 94 | 100 | Poor |
| CP2 | | | 1.74 | 1.52 | 1.46 | 1.08 | 1.43 | 1.58 | 78 | 62 | 0 | 29 | 112 | Poor |

TABLE I-continued

| Example | % Solids | Pigment/ Binder Comp | Image Densities (HP 722c) | | | | | | BWR | ICBR | VPIR | PIR | DR | Water Resistance |
|---|---|---|---|---|---|---|---|---|---|---|---|---|---|---|
| | | | blk | mag | red | yel | grn | cyan | | | | | | |
| CP3 | | | 1.6 | 1.35 | 1.35 | 0.96 | 1.23 | 1.42 | 79 | 64 | 100 | 89 | 48 | Good |
| CP4 | | | 1.73 | 1.37 | 1.28 | 0.97 | 1.35 | 1.63 | 66 | 39 | 0 | 22 | 74 | Poor |
| CP5 | | | 1.77 | 1.53 | 1.56 | 1.2 | 1.45 | 1.44 | 19 | 28 | 0 | 9 | 126 | Poor |
| 1 | 18.0 | A-Silica I & Binder I | 1.52 | 1.5 | 1.32 | 1.13 | 1.08 | 1.11 | 69 | 67 | 25 | 42 | 55 | Good |
| 2 | 18.1 | B-Silica I & Binder II | 1.58 | 1.49 | 1.33 | 1.12 | 1.08 | 1.12 | 66.5 | 68.5 | 25 | 42 | 59 | Good |
| 3 | 18.1 | C-Silica I & Binder III | 1.52 | 1.55 | 1.38 | 1.16 | 1.08 | 1.1 | 70.5 | 73 | 25 | 44 | 64 | Poor |
| 4 | 17.7 | D-Silica II & Binder I | 1.54 | 1.53 | 1.38 | 1.14 | 1.1 | 1.12 | 72 | 76 | 25 | 44 | 66 | Good |
| 5 | 17.2 | E-Silica II & Binder II | 1.58 | 1.5 | 1.35 | 1.14 | 1.09 | 1.12 | 71 | 72 | 25 | 44 | 64 | Good |
| 6 | 16.9 | F-Silica II & Binder III | 1.52 | 1.56 | 1.37 | 1.16 | 1.06 | 1.09 | 72 | 73.5 | 25 | 44 | 61 | Fair |
| 7 | 19.3 | G-Silica III & Binder I | 1.6 | 1.7 | 1.62 | 1.3 | 1.25 | 1.15 | 58 | 67 | 25 | 40 | 124 | Good |
| 8 | 17.8 | H-Silica III & Binder II | 1.63 | 1.71 | 1.62 | 1.3 | 1.28 | 1.17 | 57 | 68 | 0 | 24 | 131 | Good |
| 9 | 18.4 | I-Silica III & Binder III | 1.56 | 1.7 | 1.62 | 1.28 | 1.23 | 1.13 | 64.5 | 70 | 25 | 42 | 116 | Poor |
| 10 | 18.8 | J-Silica I/ Silica II/ Silica III & Binder I | 1.54 | 1.63 | 1.49 | 1.22 | 1.18 | 1.13 | 60 | 62.5 | 100 | 84 | 93 | Good |
| 11 | 18.3 | K-Silica I/ Silica II/ Silica III & Binder II | 1.55 | 1.58 | 1.43 | 1.17 | 1.17 | 1.11 | 60 | 61.5 | 100 | 84 | 80 | Good |
| 12 | 18.4 | L-Silica I/ Silica II/ Silica III & Binder III | 1.5 | 1.65 | 1.48 | 1.22 | 1.18 | 1.11 | 59 | 70 | 5 | 75 | 70 | 89 Poor |
| 13 | 17.2 | M-Silica I/Silica II/Silica IV & Binder I | 1.55 | 1.65 | 1.44 | 1.23 | 1.23 | 1.16 | 70 | 72 | 25 | 43 | 99 | Good |
| 14 | 17 4 | K-SilicaI/ Silica II/ Silica IV & Binder II | 1.58 | 1.67 | 1.47 | 1.26 | 1.25 | 1.21 | 66 | 68.5 | 25 | 42 | 113 | Good |
| 15 | 17 2 | SilicaI/ Silica II/ Silica IV & Binder III | 1.55 | 1.64 | 1.55 | 1.23 | 1.22 | 1.13 | 77 | 70.5 | 0 | 30 | 102 | Good |
| CP1 | | | 1.54 | 1.6 | 1.38 | 1.18 | 1.16 | 1.14 | 78 | 90 | 75 | 78 | 80 | Poor |
| CP2 | | | 1.53 | 1.66 | 1.47 | 1.26 | 1.24 | 1.12 | 73 | 89 | 100 | 91 | 100 | Poor |
| CP3 | | | 1.64 | 1.46 | 1.33 | 1.14 | 1.08 | 1.06 | 73 | 85 | 50 | 61 | 58 | Good |
| CP4 | | | 1.51 | 1.54 | 1.25 | 1.14 | 1.19 | 1.18 | 76 | 86 | 25 | 47 | 68 | Poor |
| CP5 | | | 1.49 | 1.6 | 1.53 | 1.28 | 1.33 | 1.26 | 65 | 85 | 0 | 29 | 114 | Poor |

Examples 1 to 15 generally demonstrate that the use of blends of SILICA I and/or SILICA II and SILICA III in combination with BINDER I in the pigment/binder composition of the ink jet coating composition of the present invention results in coated ink jet papers that demonstrate a balance of properties including improved imaging performance and good water resistance. The number of desirable properties achieved by the present inventive ink jet recording material is more amply demonstrated by Example 10, where good image density and water resistance is coupled with high photoimaging ratings (PIR) and density ratings (DR) for images printed by either the Epson 850 or HP 722c desktop printer. It is noted that this combination of properties was not demonstrated by the commercial ink jet papers recommended by the desktop printer manufacturers for use in the Epson 850 and HP 722c printers (i.e., CP 1 and CP 2).

In comparing Examples 1, 4, 7, 10 and 13, it can be concluded that a blend of silicas (with pore volumes and particle sizes within the stated ranges) is needed to achieve improved image densities and high photoimaging ratings and density ratings. A similar conclusion can be drawn when comparing Examples 2, 5, 8, 11, and 14 or when comparing Examples 3, 6, 9, 12, and 15.

Examples 10 and 11 demonstrate the effect of a blend of super and partially hydrolyzed polyvinyl alcohols on the intercolor bleeding rating and density rating of the coated ink jet papers. More specifically, Example 11, which employs a super hydrolyzed, medium viscosity polyvinyl alcohol binder demonstrates a lower intercolor bleeding rating and a lower density rating than that demonstrated by Example 10, which employs a blend of super and partially hydrolyzed, medium and low viscosity, polyvinyl alcohols.

It should be understood that the invention is not limited to the particular embodiments shown and described herein, but that various changes and modifications may be made without departing from the spirit or scope of the claimed invention.

What is claimed is:

1. An ink jet recording material comprising a substrate having opposing surfaces and an ink receptive layer provided on at least one opposing surface of said substrate, wherein said ink receptive layer comprises a blend of silica particles; a binder selected from the group consisting of a blend of super, fully and partially hydrolyzed polyvinyl alcohols, a blend of super and partially hydrolyzed polyvinyl alcohols and a blend of fully and partially hydrolyzed polyvinyl alcohols, wherein said polyvinyl alcohol blends are used alone or in combination with a cationic starch; a cationic resin; and a wax emulsion slip agent.

2. The inkjet recording material of claim 1, wherein said blend of silica particles comprises: a first quantity of silica particles having a pore volume ranging from about 1.4 to about 3.0 cubic centimeters per gram and an average particle size ranging from about 1 to about 17 microns; and a second quantity of silica particles having a pore volume ranging from about 0.6 to about 1.3 cubic centimeters per gram and an average particle size ranging from about 1 to about 17 microns.

3. An ink jet recording material comprising a substrate having opposing surfaces and an ink receptive layer provided on at least one opposing surface of said substrate, wherein said ink receptive layer comprises:
   a. from about 40 to about 95% by wt. (dry basis) (based on the total weight (dry basis) of pigment composition and water-soluble binder) of a pigment composition comprising a blend of silica particles, wherein a first quantity of silica particles has a pore volume ranging from about 1.4 to about 3.0 cubic centimeters per gram and an average particle size ranging from about 1 to about 17 microns, and wherein a second quantity of silica particles has a pore volume ranging from about 0.6 to about 1.3 cubic centimeters per gram and an average particle size ranging from about 1 to about 17 microns;
   b. from about 60 to about 5% by wt. (dry basis) (based on the total weight (dry basis) of pigment composition and water-soluble binder) of a water-soluble binder selected from the group consisting of a blend of super, fully and partially hydrolyzed polyvinyl alcohols, a blend of super and partially hydrolyzed polyvinyl alcohols and a blend of fully and partially hydrolyzed polyvinyl alcohols, wherein said polyvinyl alcohol blends are used alone or in combination with a cationic starch;
   c. from about 1 to about 30% by wt. (dry basis) (based on the total weight (dry basis) of the coating composition) of a cationic resin; and
   d. from about 1 to about 30% by wt. (dry basis) (based on the total weight (dry basis) of the coating composition) of a wax emulsion slip agent.

4. The ink jet recording material of claim 3, wherein said pigment composition comprises:
   a. from about 10 to about 90% by wt. silica particles having a pore volume ranging from about 1.5 to about 2.5 cubic centimeters per gram and an average particle size ranging from about 1 to about 14 microns; and
   b. from about 90 to about 10% by wt. silica particles having a pore volume ranging from about 0.6 to about 1.2 cubic centimeters per gram and an average particle size ranging from about 5 to about 17 microns.

5. The ink jet recording material of claim 3, wherein said water-soluble binder comprises:
   a. from about 10 to about 90% by wt. of a super hydrolyzed, medium viscosity polyvinyl alcohol;
   b. from about 10 to about 70% by wt. of a partially hydrolyzed, medium viscosity polyvinyl alcohol; and
   c. from about 0 to about 20% by wt. of a partially hydrolyzed, low viscosity polyvinyl alcohol.

6. The ink jet recording material of claim 5, wherein said water-soluble binder further comprises from about 1 to about 50% by wt. of a cationic starch.

7. The ink jet recording material of claim 3, wherein said cationic resin is selected from the group consisting of polyvinyl benzyl trimethyl ammonium chloride, polydiallyl dimethyl ammonium chloride, polymethacryloxyethyl hydroxy ethyldiammonium chloride, quaternary acrylic copolymer latex, amidoepichlohydrin copolymer, dimethylaminoethylmethacrylate copolymer, vinyl pyrrolidone dimethylaminoethylmethacrylate copolymer, polyallylamine, polyvinylamine, vinyl amine acrylonitrile copolymers, polyalkylene imine polymers, polyalkylene polyamine polymers, polyalkylene polyamide dicyandiamide copolymers, polyamide dicyandiamide copolymers, quaternary ammonium polymers and blends thereof.

8. The ink jet recording material of claim 7, wherein said cationic resin is polydiallyl dimethyl ammonium chloride.

9. The ink jet recording material of claim 3, wherein said wax emulsion slip agent is a high density polyethylene wax dispersion slip agent.

* * * * *

UNITED STATES PATENT AND TRADEMARK OFFICE
CERTIFICATE OF CORRECTION

PATENT NO. : 6,660,348 B2
DATED : December 9, 2003
INVENTOR(S) : Simon R. Cuch et al.

It is certified that error appears in the above-identified patent and that said Letters Patent is hereby corrected as shown below:

Column 8,
Line 3, change "pigmentibinder" to -- pigment/binder --.

Column 12,
Line 9, change "pigmentibinder" to -- pigment/binder --.

Columns 11 and 12,
TABLE I, under EPSON 850, DR. Example 1, change "87" to -- 81 --.
TABLE I, under EPSON 850, DR. Example 2, change "79" to -- 72 --.
TABLE I, under EPSON 850, DR. Example 3, change "104" to -- 101 --.
TABLE I-continued, under HP 722c, Image Densities, cyan, Example CP5, change "1.26" to -- 1.2 --.

Signed and Sealed this

Sixth Day of April, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,660,348 B2
DATED : December 9, 2003
INVENTOR(S) : Simon R. Cuch et al.

It is certified that error appears in the above-identified patent and that said Letters Patent is hereby corrected as shown below:

Column 4,
Line 16, change "A" to -- µ --.

Signed and Sealed this

Twenty-ninth Day of June, 2004

JON W. DUDAS
*Acting Director of the United States Patent and Trademark Office*